(12) United States Patent
Johnson et al.

(10) Patent No.: US 7,834,593 B2
(45) Date of Patent: Nov. 16, 2010

(54) THERMAL RUNAWAY PROTECTION SYSTEM FOR A BATTERY CHARGER

(75) Inventors: Thomas F. Johnson, Schaumburg, IL (US); John S. Whiting, Arlington Heights, IL (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 0 days.

(21) Appl. No.: 12/040,577

(22) Filed: Feb. 29, 2008

(65) Prior Publication Data

US 2009/0218990 A1 Sep. 3, 2009

(51) Int. Cl.
*H02J 7/04* (2006.01)
*H02J 7/16* (2006.01)

(52) U.S. Cl. ..................................... 320/150
(58) Field of Classification Search .......... 320/150–153
See application file for complete search history.

(56) References Cited

U.S. PATENT DOCUMENTS

| | | | |
|---|---|---|---|
| 4,609,861 | A | 9/1986 | Inaniwa et al. |
| 5,214,370 | A | 5/1993 | Harm et al. |
| 5,570,001 | A * | 10/1996 | Fenley .................. 322/36 |
| 5,574,355 | A * | 11/1996 | McShane et al. ........... 320/161 |
| 6,020,721 | A | 2/2000 | Brotto |
| 6,313,608 | B1 | 11/2001 | Varghese et al. |
| 2005/0088144 | A1 | 4/2005 | Pacholok et al. |
| 2007/0018780 | A1 | 1/2007 | Furukawa et al. |
| 2007/0114970 | A1 | 5/2007 | Johnson et al. |

FOREIGN PATENT DOCUMENTS

WO WO 2004/097956 A2 11/2004

\* cited by examiner

*Primary Examiner*—Edward Tso
*Assistant Examiner*—Ramy Ramadan
(74) *Attorney, Agent, or Firm*—John S. Paniaguas; Katten Muchin Rosenman LLP (57) ABSTRACT

A protection system and method for a battery charger is disclosed for detecting a thermal runaway condition in a battery during charging in order to protect the battery when such a thermal runaway condition has been detected. The protection system in accordance with the present invention does not require external temperature sensors nor does it rely on actions by the technician or user. Briefly, the protection system includes one or more electrical sensors normally provided with conventional battery chargers for sensing one or more electrical parameters during charging and providing an indication of a possible thermal runaway condition based upon the trend of the electrical charging parameters. In general, the protection system monitors the charging characteristics of a battery for a complete or partial charging cycle. If the charging characteristics deviate from a normal or otherwise indicate an anomaly, as determined by software, the system assumes there may be a thermal runaway condition and executes a protection measure, such as terminating charging of the battery. Even though the anomaly may not be the result of a thermal runaway condition, the protection system in accordance with the present invention treats the anomaly as an indication of a thermal runaway condition even though some other problem is the reason for the anomaly. For example, when the anomaly is the result of a bad cell, battery charging is terminated to prevent a thermal runaway condition and not because a thermal runaway condition is detected.

14 Claims, 6 Drawing Sheets

THERMAL RUNAWAY PROTECTION SYSTEM FOR A BATTERY CHARGER

BACKGROUND OF THE INVENTION

1. Field of the Invention

The present invention relates to a protection system for use with a battery charger and more particularly to a protection system for a battery charger for detecting a thermal runaway condition during charging of a battery and protecting the battery when such a thermal runaway condition is detected.

2. Description of the Prior Art

Various battery chargers are known in the art. Some known battery chargers include protection against a thermal runaway condition. Thermal runaway can cause overheating of a battery during charging which can result in damage to the battery as well as personal injury. Thermal runaway occurs as a result of heating of the electrical conductors in the battery during charging. More particularly, thermal runaway occurs when the electrolyte in the battery gets hot. When the electrolyte gets hot, heat is transferred from the electrolyte to the electrical conductors within the battery causing the temperature of those conductors to rise. Since, the resistance of an electrical conductor is inversely proportional to the temperature of the conductor, I the resistance of the electrical conductor decreases. Thus, if the battery charger is providing a constant voltage to the battery under charge, the current will increase in proportion to the decrease in resistance. During such a condition, the battery voltage does not increase even though the charging current is increased. The battery voltage is known to either remain the same or decrease. The increased charging current causes the electrolyte to get even hotter. resulting in the even more charging current to be drawn by the battery placing the battery in a thermal runaway condition. The risk of a battery experiencing a thermal runaway condition is increased during relatively high ambient temperature conditions.

The effect on the battery as a result of a thermal runaway condition depends on the type of battery. For example, in flooded electrolyte batteries, such as lead acid batteries, a thermal runaway condition can cause the electrolyte to boil off; thereby disabling the battery. In sealed batteries, a thermal runaway condition can cause expansion of the electrolyte and an explosion of the battery and possibly personal injury.

Various hardware solutions have been proposed to solve the thermal runaway problem of a battery. Examples of such hardware solutions are disclosed in U.S. Pat. Nos. 5,214,370 and 6,020,721 as well as US Patent Application Publication No. US 2007/0018780 A1 and International Patent Application Publication No. WO 2004/097956 A2.

These hardware solutions all rely on temperature sensors to detect the battery temperature and the ambient temperature. The temperature sensors for detecting the temperature of the battery are known to be connected to various locations on a battery, such as the battery terminals, the plates in the battery or in the electrolyte. The temperature sensors for sensing the ambient temperature are disposed within the battery charger. By detecting the battery temperature during charging, the battery charger can detect when a battery is experiencing a thermal runaway condition.

Although such battery chargers which rely on external temperature sensors to detect and protect against a thermal runaway condition, there are several problems with such systems. In particular, many conventional batteries are not known to be provided with temperature sensors. As such, temperature sensors must be provided along with the battery charger and connected to the battery. These temperature sensors are typically configured to be connected to a surface of a battery or to a battery terminal to provide an indication of the battery temperature during charging.

There are several known problems with such hardware solutions. For example, in automotive and marine battery charging applications, battery temperature sensors are most often not provided with the battery. Thus, the use of external temperature sensors must be relied upon. However, the service technicians may not always connect the temperature sensors to the battery surface or battery terminals. Without the battery temperature, the battery charging system is unable to detect a thermal runaway condition. Moreover, the electrical conductors attached to the temperature sensors may eventually break off after repeated use.

The '721 patent accounts for such a situation and provides a monitoring circuit for monitoring for broken or disconnected electrical conductors that are connected to the temperature sensors. In the event that a disconnected or broken electrical conductor is detected, the battery charger is placed in a fail safe condition and charging is suspended. Such a solution essentially renders the battery charger unusable until the broken wire is repaired. Moreover, if the thermistor used to sense battery temperature is damaged or becomes disconnected from the electrical conductor or becomes misplaced, the battery charger is rendered inoperable In order to avoid such problems, some known battery chargers do away with the need for battery and ambient temperature sensors altogether and simply rely on a manual ambient temperature switch on the battery charger and rely on the user selecting an ambient temperature range. For example, such a manual temperature switch is provided on a 15 Amp Smart Battery Charger as manufactured by West Marine of Watsonville, Calif. That battery charger includes a manual ambient temperature selector which allows a technician to manually select three different ambient temperature conditions:

Cold: 32° F.-60° F.
Warm: 60° F.-85° F.
Hot: 85° F.-104° F.

In such an application, the user selects an ambient temperature range before charging. Although relative high ambient temperatures can result in a thermal runaway condition, the system does not take into account the temperature of the battery and thus is a relatively crude and inaccurate method for detecting a thermal runaway protection. Moreover, the technicians may not always remember to set the manual ambient temperature switch.

Thus there is a need to provide a protection system and method for detecting a thermal runaway condition in a battery and providing protection of the battery when a thermal runaway condition has been detected which does not require the use of external temperature sensors or any actions by a technician or operator.

SUMMARY OF THE INVENTION

The present invention relates to a protection system and method for a battery charger for detecting a thermal runaway condition in a battery during charging in order to protect the battery when such a thermal runaway condition has been detected. The protection system in accordance with the present invention does not require external temperature sensors nor does it rely on actions by the technician or user. Briefly, the protection system includes one or more electrical sensors normally provided with conventional battery chargers for sensing one or more electrical parameters during charging and providing an indication of a possible thermal runaway condition based upon the trend of the electrical charging parameters. In general, the protection system monitors the charging characteristics of a battery for a complete or partial charging cycle. If the charging characteristics deviate from a normal or otherwise indicate an anomaly, as determined by software, the system assumes there may be a thermal runaway condition and executes a protection measure, such as terminating charging of the battery. Even though the anomaly may not be the result of a thermal runaway condition, the protection system in accordance with the present invention treats the anomaly as a problem that requires corrective action. For example, when the anomaly is the result of a bad cell, battery charging is terminated to prevent a thermal runaway condition and not because a thermal runaway condition is detected.

DESCRIPTION OF THE DRAWING

These and other advantages of the present invention will be readily understood with reference to the following specification and attached drawing wherein.

DETAILED DESCRIPTION

The present invention relates to a protection system for a battery charger that utilizes software to detect a thermal runaway condition, thereby eliminating the need for external temperature sensors and which does not rely on actions by the technician or user. Briefly, the protection system includes one or more electrical sensors for sensing one or more electrical parameters and determining a thermal runaway condition based upon the trend of the electrical charging parameters. In general, the system monitors the charging characteristics of a battery during a normal charging cycle. If the charging characteristics deviate from a normal charging cycle by a significant amount as determined by software, the system assumes a thermal runaway condition. For example, in one embodiment of the invention, the voltage and current is monitored during an initial phase of the charging cycle in which the charging current is held constant or controlled and the voltage is monitored.

During a normal charging cycle, the battery voltage will continually ramp up to a predetermined value or a point at which point dV/dt=0 during an initial phase. During this initial phase of the charging cycle, the battery voltage is monitored along with the charging current. Should the battery voltage fail to continually ramp up or if additional charging current beyond the nominal is required to get the voltage of the battery to the point where dV/dt=0, then the software assumes a thermal runaway condition exists. Alternatively, the battery voltage may be monitored during an initial phase. Should the battery voltage fail to reach a predetermined voltage, for example, in a predetermined amount of time, a thermal runaway condition is presumed.

During a subsequent phase of the charging characteristic, i.e. a constant voltage phase of the charging cycle, the voltage and current are monitored. During a normal charging cycle, a decreasing amount of charging current is required to maintain a constant battery voltage. Should the system detect an anomaly, such as, increases in the amount of charging current while the voltage is constant, a thermal runaway condition is assumed. Alternatively, during the constant voltage phase of the charging cycle, should any increase in charging current be detected or any increase with respect to time, i.e. di/dt, the system assumes a thermal runaway condition. In one embodiment of the invention, the system monitors the duty cycle of the charging current and tracks the trend in the duty cycle throughout a charging cycle. When the trend in the duty cycle indicates an anomaly, a thermal runaway condition is indicated. By providing a software method for detecting a thermal runaway condition, the problems associated with external temperature sensors mentioned above are eliminated.

Figure 1A:
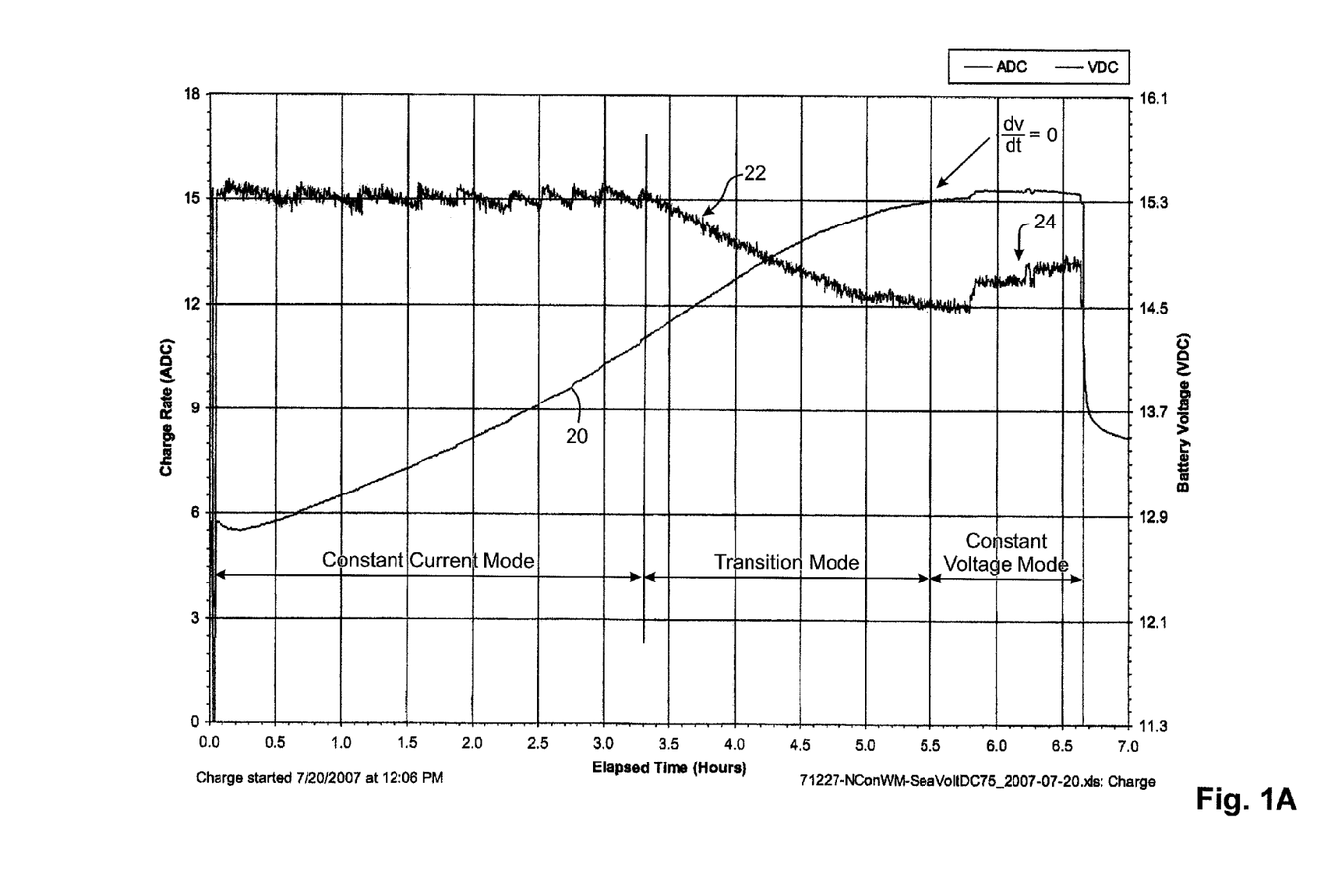
FIG. 1A is graphical illustration of exemplary charging characteristics of a West Marine SeaVolt Deep Cycle 75 battery being charged by a DieHard Model 71227 battery charger with an exemplary thermal runaway condition shown near the end-of-charge condition.
Figure 1B:
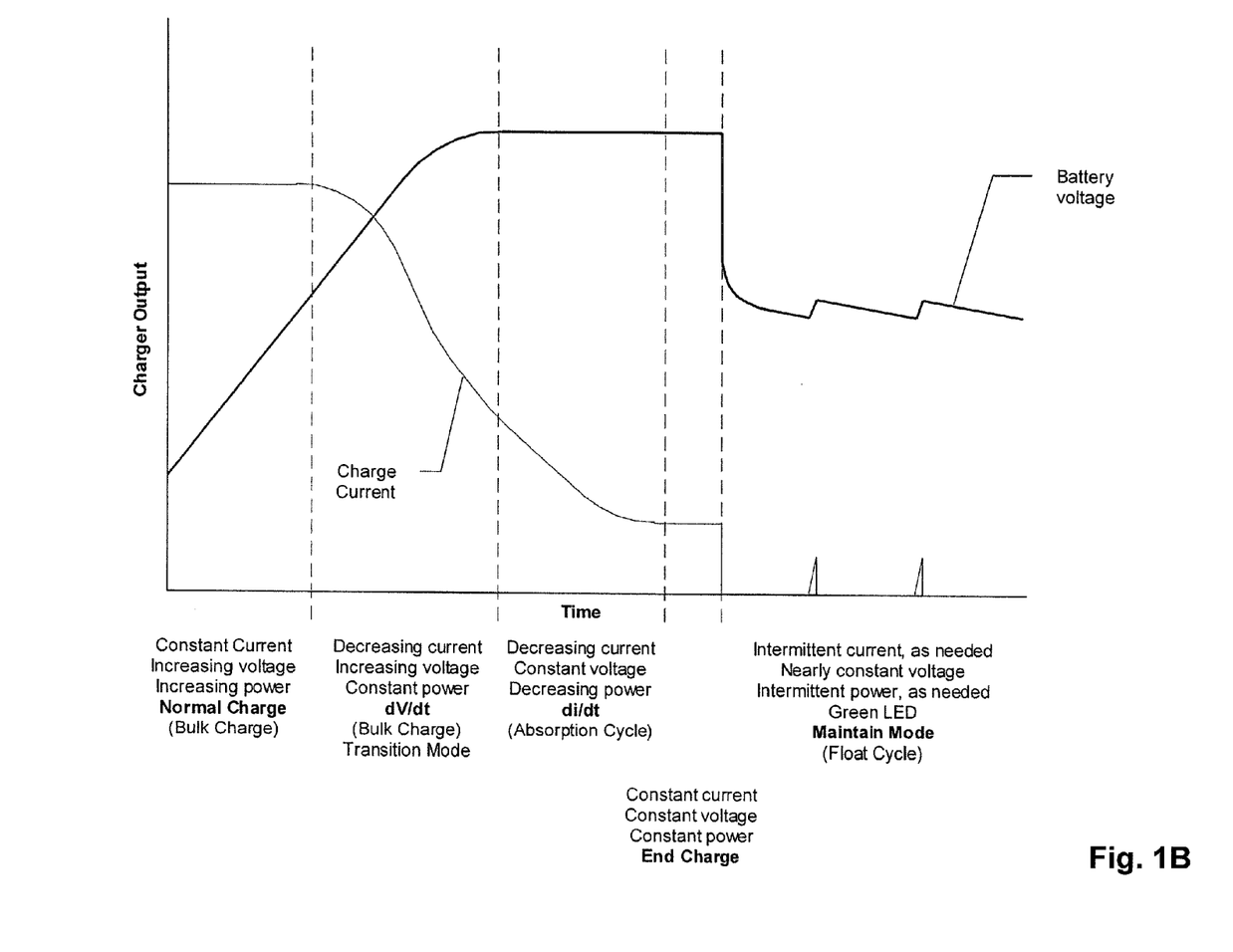
FIG. 1B is an exemplary diagram of the charging characteristics for an exemplary battery which illustrates the various stages of a typical charging cycle.

The invention is best understood with reference to FIGS. 1A and 1B, which illustrate exemplary charging characteristics for an exemplary battery. The curve 20 (FIG. 1A) represents closed circuit battery charging voltage as a function of time, while the curve 22 represents current as a function of time for an exemplary lead acid battery, such as a West Marine SeaVolt Deep Cycle 75 battery. During a normal charging cycle, the battery is charged with a constant current.

As used herein constant current charge mode is defined as an initial portion of the charging cycle, for example as illustrated in FIGS. 1A and 1B. The principles of the present invention are also applicable to battery chargers in which initial portion of the charging cycle is an alternating DC current, as generally described In U.S. patent application Ser. No. 11/487,071, filed on Jul. 14, 2006, published as US Patent Application Publication No. US 2007/0114970 A1 on May 24, 2007, entitled "Battery Charger and Method Utilizing Alternating DC Charging Current", hereby incorporated by reference.

As shown in FIG. 1A, the battery is charged in a constant current mode for about 3.5 hours. During the constant current mode, the closed circuit charging voltage continually rises from about 11.9 volts DC to about 14.2 volts DC as a result of the battery voltage rising. More particularly, the closed circuit charging voltage is the sum of the open circuit battery voltage $V_{BATT}$+the product of the charging current $I_{CHARGE}$ and the resistance of the battery circuit $R_{CIRCUIT}$. The resistance $R_{CIRCUIT}$ includes the internal battery resistance+the battery terminal resistance+the resistance of the battery charging circuit. Thus during a constant current mode an increase of battery voltage $V_{BATT}$ resulting from charging results in an increase in the closed circuit charging voltage.

As mentioned above, in accordance with the present invention, the charging characteristics are monitored to determine if they follow the normal charging characteristics. Any anomalies in the charging characteristics are assumed by the software to represent a condition, for example, a thermal runaway condition, that requires correction. For example, during a constant current mode, should the battery closed circuit voltage begin to drop; above average current be required to cause closed circuit voltage level to rise to a predetermined level; or an above average time be required for the closed circuit voltage to rise to a predetermined level or any combination of the above are treated as a thermal runaway condition.

FIG. 1A illustrates an exemplary constant voltage mode, when dV/dt=0 about 5.6 hours. As shown, there is a transition mode between the constant current mode and the constant voltage mode. During the transition mode, the charging current is reduced from 15 amperes DC to about 12 amperes DC. During this transition mode, the battery closed circuit voltage rises to about 15.3 volts DC, where it is maintained due to the increased open circuit battery voltage $V_{BATT}$. This point is identified in FIG. 1 as a point of constant voltage or dV/dt=0. In particular, the system remains in a constant voltage mode from the point dV/dt=0 until the battery is fully charged, i.e. at an end of charge condition. Under normal conditions, an end of charge condition is assumed when the charging current drops below a predetermined charging current or the charging current levels off in a constant voltage mode of operation.

Should any anomalies occur during the transition mode or the constant voltage mode, the system assumes a thermal runaway condition. During a transition mode, any anomaly is assumed to be a thermal runaway condition. For example, should the closed circuit charging voltage drop or the time to reach the constant voltage state, i.e. dV/dt, be too long relative to a normal charging characteristic, or the current increase during the transition mode, a thermal runaway condition is assumed.

As mentioned above, the battery charger is in a constant voltage mode when dV/dt=0. The battery charger remains in a constant voltage mode until the charging current continuously drops. When the charging current drops below a predetermined value or levels off, the battery is considered to be at an end of charge condition. This value is normally determined to be the value that is slightly greater, for example 5% greater, than the amount of discharge of the battery from a fully charged condition.

At about 5.7 hours, the charging current is intentionally increased resulting in an increase in the closed circuit charging voltage. Such increases are typical for deep cell batteries and does not represent an anomaly. At about 6.2 hours, identified by the reference numeral 24, the closed circuit voltage begins dropping while the charging current 20 is increasing. Such a condition represents an anomaly, which is assumed by the protection system to be a thermal runaway condition. As such the end of charge stage was terminated much sooner than normal, i.e about 48 minutes instead of the normal 75 minutes.

A thermal runaway condition may also be based upon a rate of change of charging current. More particularly, with reference to the curve 22, the current curve 22 illustrates the charging current normally decreasing, i.e having a negative slope, from about 3.5 hours to about 5.7 hours where the charging current levels off at about 12 amperes. During a normal charging cycle, the charging current should either continue to decrease or continue leveling off. Should the charging current begin to increase, i.e switch to a positive slope, in the constant current mode or any mode any mode without a corresponding increase in closed circuit voltage, the system also assumes a thermal runaway condition. In other words should the rate of change of current with respect to time, i.e. di/dt, goes from a negative slope or 0 to a positive slope without a corresponding increase in the closed circuit charging voltage, a thermal runaway condition may be assumed.

Figure 2:
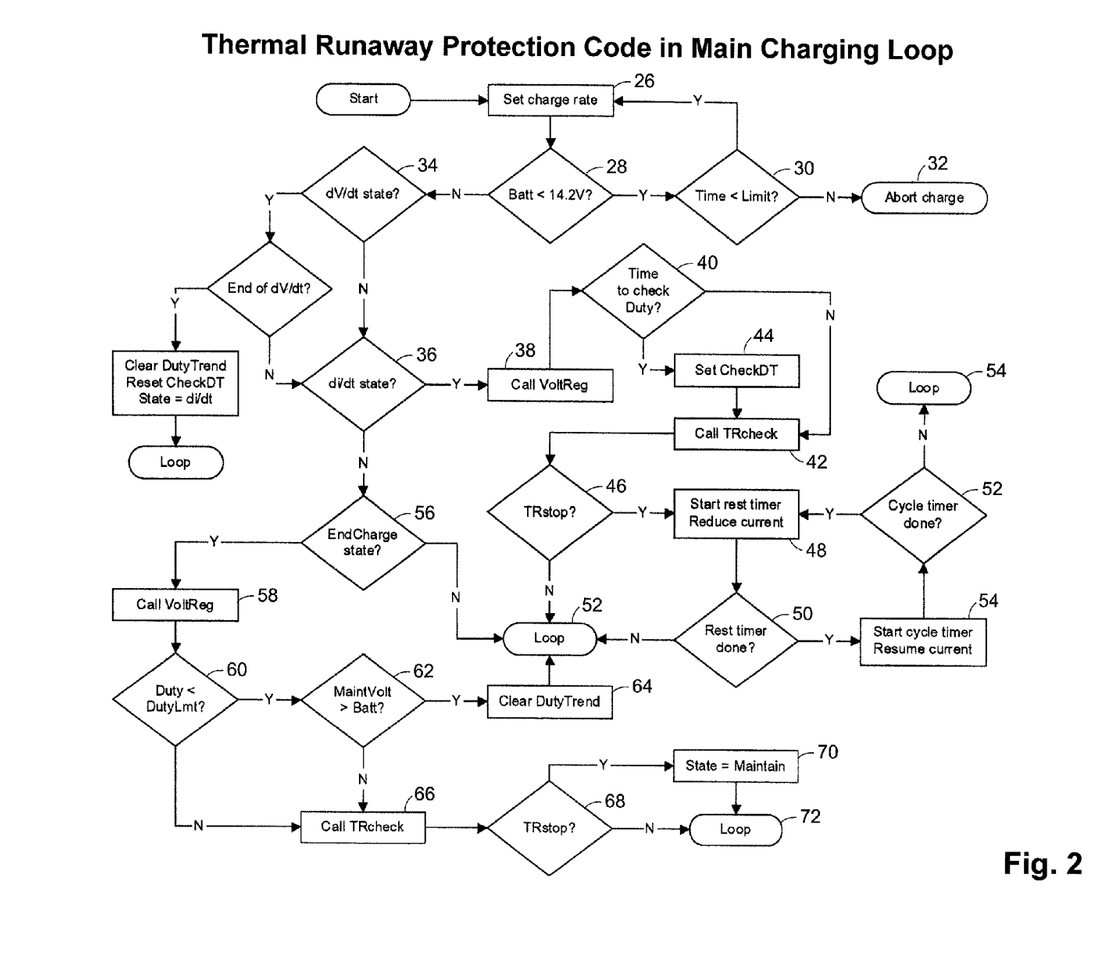
FIG. 2 is an exemplary software flow diagram for an exemplary embodiment of the main charging loop for use with a battery charger in accordance with the present invention.
Figure 3:
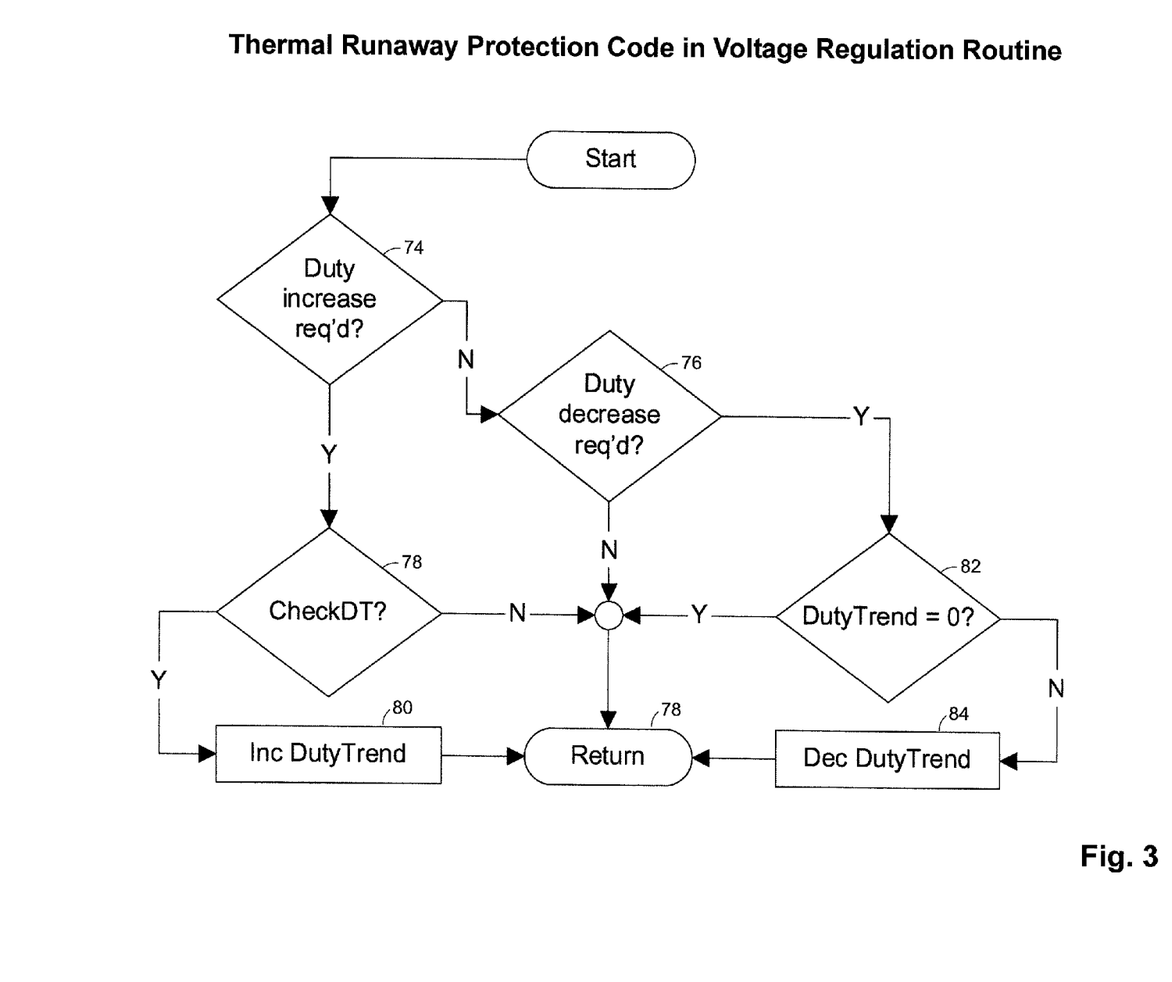
FIG. 3 is a software flow diagram for a VoltReg subroutine in accordance with one embodiment of the present invention.
Figure 4:
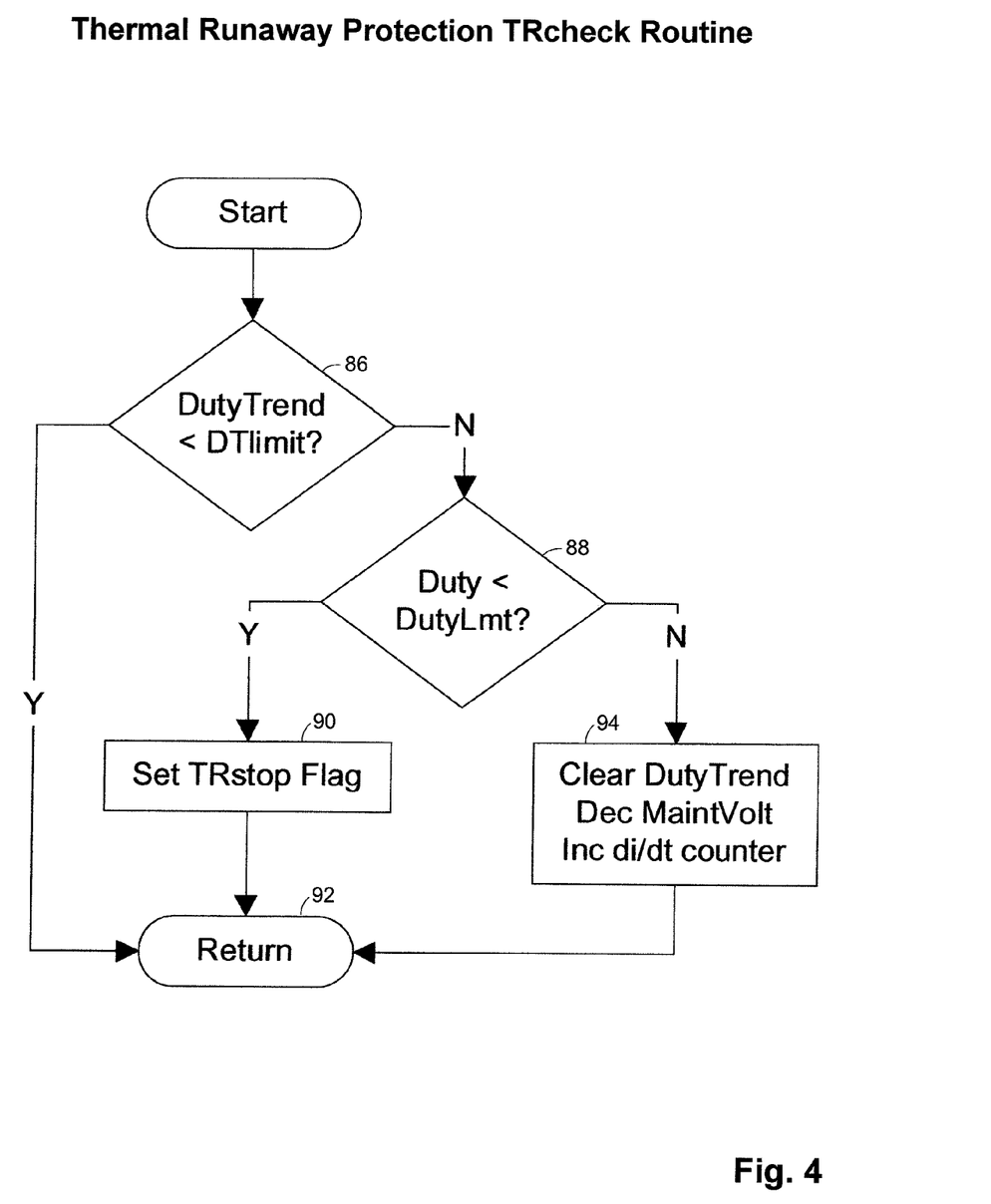
FIG. 4 is a software flow diagram for a TRcheck subroutine in accordance with one embodiment of the present invention.
Figure 5:
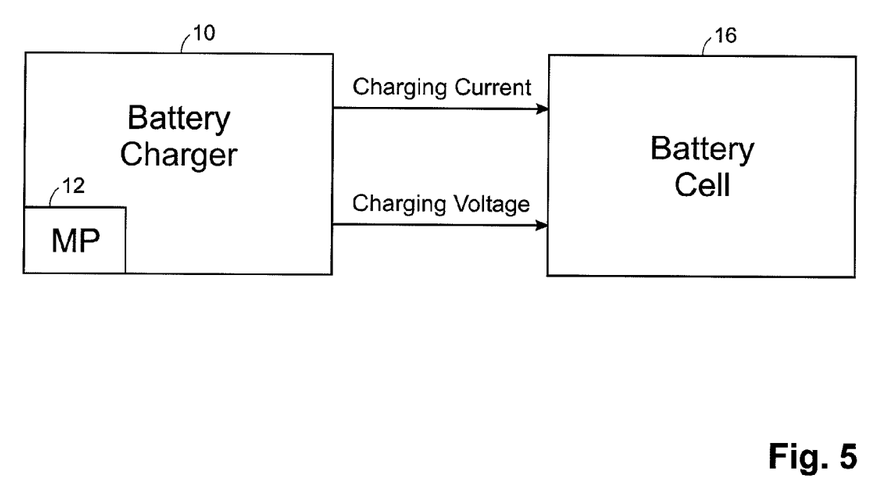
FIG. 5 is a block diagram of a battery charger that is configured to detect a thermal runaway condition and provide protection of the battery during such a condition.

FIGS. 2-4 illustrate exemplary software for detecting a thermal runaway condition in accordance with one aspect of the invention. The present invention can be implemented on virtually any battery charger, for example, the battery charger, illustrated in FIG. 5 and identified with the reference numeral 10, disclosed in commonly owned co-pending US Patent Application Publication No. 2005/0088144 A1, hereby incorporated by reference, which includes a microprocessor/microcontroller 12. Moreover, the principles of the present invention are applicable to any battery types, such as lead acid, absorbed glass mat (AGM), spiral wound AGM valve regulated lead acid (VRLA), flooded cell and deep-cycle batteries, generally identified by the reference numeral 16.

Referring to FIGS. 2-4, the main software loop is illustrated in FIG. 2. This loop runs continuously, for example, at 120 times per second during the entire charging cycle of a battery to account for the fact that the 60 Hertz AC input power provides a he 120 Hertz waveform on the secondary of the charger step down transformer. Initially in step, 26, after the charge rate is selected by the user, for example, 2, 10, 12 or 15 amperes, the system checks the battery voltage in step 28 to determine whether the the battery cycle is in the constant current mode or the constant voltage mode. As illustrated in FIG. 2, an exemplary value of 14.2 volts DC is selected as a threshold for determining the mode of the battery cycle. If the battery closed circuit voltage is less than the threshold value of 14.2 volts, the system forces the battery cycle to be in the constant current mode, for example as indicated in FIG. 1. As mentioned above, any anomaly relative to a normal charging cycle is considered to be a thermal runaway condition. In this exemplary embodiment, the system measures the time it takes the battery to reach a threshold voltage value of, for example, 14.2 volts DC, roughly 93% of the constant voltage value of 15.3 volts DC (FIG. 1). In this embodiment, the system assumes a constant current mode as long as the elapsed time since the charge limit is less than a limit value, for example, 3.0 hours, as illustrated in FIG. 1 as illustrated in step 30. If the elapsed time is less than the limit, the system loops back to step 26 in order to adjust the charge rate based upon the most recent closed circuit battery voltage measurement, for example 120 times per second, and rechecks the battery closed circuit voltage again This process continues until the battery open circuit voltage becomes greater than the threshold value. In this embodiment, should the voltage continue to be less than the threshold voltage of 14.2 volts and the elapsed time since the charge rate was set exceed the time limit mentioned above, the system assumes an anomaly, such as, a thermal runaway condition, and aborts charging in step 32. Such a scenario can occur in relatively high ambient temperature conditions.

Other parameters other than time and voltage could also be used to detect a thermal runaway condition during a constant current mode of operation. For example, the rate of change of the voltage could be used as an indication of a thermal runaway condition. With reference to FIG. 1, the voltage curve 20 has a relatively linear positive slope during a constant current mode of operation. Thus the rate of change of voltage, dV/dt, or slope as a as a function of various other parameters can be used to indicate a thermal runaway condition. These other parameters include time, charging current, the rate of change of charging current, di/dt, and voltage. Moreover, any combination of these parameters can be used to indicate an anomaly in a normal battery charging cycle and thus indicative of a thermal runaway condition. All of such embodiments are within the scope of the present invention.

Once the system determines that the battery open circuit voltage is greater than or equal to the threshold value, for example, 14.2 volts DC, the system checks in step 34 whether the cycle has just reached the constant voltage mode, i.e the point where dV/dt=0. In step 36, the system checks if the charging cycle is in the constant voltage mode of operation but beyond the initial point of dV/dt=0. If so, the system calls the VoltReg subroutine (FIG. 3) in step 38. The VoltReg subroutine controls the duty cycle of the charging current to regulate the battery voltage, In particular, during a constant voltage mode of operation, the VoltReg subroutine controls the duty cycle of the charging current to maintain a constant charging voltage.

In this exemplary embodiment of the invention, the system monitors the duty cycle of the charging current and the upward and downward trends in the duty cycle and uses these parameters to indicate a thermal runaway condition. In particular, the variable DUTY is used to track and control the duty cycle of the charging current. The variable DT relates to the Duty Trend and is used to track the up/down trend of the duty cycle. In step 40, the system determines whether it is time to check the duty cycle.

Typically, the duty cycle is maintained constant after the battery closed circuit voltage reaches about 14.2 volts DC. i.e. the end of the constant current mode, until the end of the constant voltage mode. The duty cycle is generally not varied after the constant current mode to maintain a constant voltage or a constant current. For linear chargers, constant duty cycle results in constant power. Accordingly, the charging current decreases as the battery voltage rises and thus the closed circuit battery charging voltage rises. Some known high frequency chargers are also known to operate in the same manner. Other known high frequency chargers are known to operate such that a constant current is maintained until the end of the transition mode.

The interval for checking the duty cycle during a constant current mode is a fixed interval, such as about 10 minutes plus or minus a few minutes. The system checks the duty cycle for every 3 or 4 consecutive values that have not changed to determine if di/dt is close to zero. In an exemplary embodiment, the first time the system checks a flag is set to allow for thermal runaway checkink. That way, fluctuations that are typical for the start of the constant current mode are not treated as thermal runaway. Also, the constant current mode is guaranteed to last for at least the first checking interval.

If it is time to check the duty cycle output, the system checks the duty trend DT. As mentioned above, an anomaly in the duty cycle during the constant current portion of the charging cycle may be indicative of a thermal runaway condition. For example, as illustrated in FIG. 1, a decrease in the battery voltage during the constant current mode of the charging cycle may be used to indicate a thermal runaway condition. Thus, if it is not time to check the duty cycle as indicated in step 40, the TRcheck subroutine is called in step 40 to determine if a thermal runaway condition exists without setting the CheckDT flag in step 44. If the system determines in step 40 that it is time to check the duty cycle of the charging current, a Check DT flag is set in step 44 before the TRcheck subroutine is called in step 42. The system checks in step 46 if a TRstop flag is set by the TRcheck subroutine, indicating a thermal runaway condition. If so, a rest timer is started in step 48 and the charging current is reduced to provide a rest period to enable the components to cool.

The rest timer may be set, for example to a predetermined value. For example, a rest period of about 3 minutes is set between periods of high current, which are typically less than 2 minutes. An exemplary charge time may be selected as 5 minutes followed by five minutes of rest to minimize the risk of a thermal runaway condition. Rather than cycle between charge and no charge, the system can be cycled from a high charge rate to a low charge rate or a combination of the above.

In step 50, the system checks whether the rest timer is timed out. If not, the system proceeds to step and awaits for the rest timer to time out. Once the rest timer times out, a cycle timer is started in step 54 and normal charging current is resumed. The system checks in step 52 whether the cycle timer has timed out. If not, the rest timer is restarted and the charging current is reduced.

If the system determines in step 36 that the charging cycle is not in a constant current mode, the system next checks in step 56 whether the battery cycle is in an end of charge state, As illustrated in FIG. 1B, the end of charge state occurs during a constant voltage mode after a di/dt state and before a maintenance state. An end of charge mode is used for certain battery types, such as deep cell batteries, to put as much charge on the battery as possible. As shown in FIG. 1A, the end of charge state begins at about 5.8 hours. The end of charge state may typically be from 15 minutes to 2 hours or not be used at all depending on the type of battery being charged. During such an end of charge state, the duty cycle of the charging current is increased to increase the battery voltage.

The maintain state is used to keep fully charged batteries charged. In a maintain state, the closed circuit charger voltage is held to a voltage lower than the normal charging voltage but higher than the open circuit battery voltage. For 12 volt batteries, the maintain voltage ranges from 13.2 to 13.6 volts DC depending on the charger and the battery type. If a battery is fully charged, minimal charging current, for example, <100 milliamps is required to maintain state is illustrated at beginning at about 6.65 hours.

If the charging cycle is not in an end of charge state, the system proceeds to step 52 and returns to the main loop. If the system determines that the charging cycle is in at end of charge state, the system calls the VoltReg subroutine in step 58 to adjust the duty cycle of the charging current to provide a maintenance voltage, such as, 13.5 volts DC to the battery. After the maintenance voltage is set in step 60, the system checks whether the duty cycle of the is less than the DtyLmt. The DtyLmt is a variable used to track the maximum duty cycle used for voltage regulation. If the duty cycle is less than the duty limit DtyLmt, as determined in step 60, the system checks whether the regulation target voltage MaintVolt is greater than the battery voltage in step 62.

The variable MaintVolt is the regulation target voltage value of the voltage output of the battery charger which varies throughout the charging cycle. For example, with reference to FIG. 1, the charging voltage is varied during the constant current mode to maintain the constant current. The charging voltage is about 15.4 volts during an End Of Charge mode, as discussed above and about 13.2 volts (not shown) during a maintenance mode.

If so, the Duty Trend variable is cleared in step 64 and the system proceeds to 52 and returns to the main loop. If the regulation target voltage MaintVolt is less than the battery voltage, the system calls the TRcheck subroutine in step 66. In step 68, the system checks whether a TRstop flag has been set. The TRstop flag indicates a thermal runaway condition. If so, the battery charger remains in a maintenance charge state in step 70 and proceeds to step 72 and returns to the main loop.

If the system determines in step 34 that the battery charger is in the, dv/dt state (FIG. 1B), the system next checks in step 35 whether the battery charger is at the end of the constant voltage mode. As mentioned above, the end of the dV/dt state is determined when the charging current is less than a predetermined minimum value, for example, <100 milliamps or leveling off at a constant value. If not, the system proceeds to step 36 and proceeds as discussed above. If the system does indeed detect that the state of the charging cycle is at the end of the dV/dt state, the Duty Trend is cleared and a variable check DT State is set to the dI/dt state in preparation of the next charging cycle in step 37 and the system returns to the start of the main loop in step 39.

The VoltReg subroutine is illustrated in FIG. 3. As mentioned above, this subroutine is used to adjust the duty cycle of the charging current. In response to a call from the main program (FIG. 2), the VoltReg subroutine determines whether an increase or decrease in the duty cycle is required in steps 74 and 76. If a no change in the duty cycle is required, control proceeds to step 78 and the system returns to the main loop (FIG. 2). If an increase in the duty cycle is required, the system checks the duty trend DT. In particular, if it is determined in step 78 that the duty cycle is being increased and the duty cycle in the previous cycle was increased, a DutyTrend counter is incremented by one indicating an increasing voltage trend in step 80 before the system returns. If the duty cycle in the previous cycle was decreased, the system proceeds to step 78 and returns to the main loop. If the duty cycle is currently being decreased, the system checks the DutyTrend counter to determine if it is at 0 in step 82. If so, the system proceeds to step 78 and returns to the main loop. If not, the DutyTrend counter is decreased by one in step 84 before the system returns to the main loop.

An exemplary TRcheck subroutine is illustrated in FIG. 4. As mentioned above, in this exemplary embodiment, theTRcheck subroutine is used to determine a thermal runaway condition. Initially in step 86, the DutyTrend counter is checked to determine if it is less than DTlimit, an integer greater than 3 that depends on the speed of the voltage regulation and charger hardware, used to indicate a thermal runaway condition. If the DutyTrend counter value is greater than DTlimit, the system proceeds to step 88 and checks whether the current duty cycle is greater than DutyLmt, a variable used to limit the maximum duty cycle for the charging current. The duty cycle limit depends upon the charge rate selected and the charger hardware. Typically, the duty cycle limit is higher for higher charge rates. Many known chargers use 100% duty cycle when an engine start function is incorporated into the battery charger. In such an application, the maximum duty cycle would depend on the ratio of the charge rate selected to the engine start rate. Typically, the duty cycle will be higher during a constant current mode than in a maintenance mode. Thus the duty cycle limit could range from a few percent to 100% depending on the factors discussed above.

If the duty cycle is less than the variable DtyLmt, a TRstop flag is set in step 90 indicating a thermal runaway condition. In some known battery chargers, the voltage is boosted in an end of charge condition. In order to avoid triggering a thermal runaway indication, the system checks in step 88 whether the duty cycle is greater than the variable DutyLmt. If so, the DutyTrend counter is cleared and a di/dt counter is cleared in step 94. Also, the target regulation voltage, i.e MaintVolt is decreased, and a dI/dt counter is incremented. If the duty cycle is too high, it is possible that the target regulation voltage was too high. Therefore, in such a situation, instead of assuming a thermal runaway condition in such a situation, the charger reduces the target regulation voltage, i.e. MaintVolt, which should reduce the charge rate. The Duty Trend variable is cleared because the constant voltage mode is restarted at a lower charge rate. The di/dt counter, i.e cycle timer, is set to a nominal value, for example 4, when the constant voltage mode is started. The duty cycle is checked at preset intervals, as indicated in step 40 in FIG. 2. The di/dt counter is decreased if the duty cycle stops decreasing. If the di/dt counter reaches 0, this means that the duty cycle has leveled off and the constant voltage mode is finished. If the constant voltage mode is restarted at a lower target regulation voltage, the di/dt counter is incremented so that the constant current mode continues for at least another checking cycle.

During a normal charging cycle, the duty cycle is normally lower than the upper limit at the end of the constant current mode or thermal runaway starts. Normally, the duty cycle starts near the upper limit and steadily decreases.

The protection system in accordance with the present invention is not only configured to detect a thermal runaway condition but to also provide various responses to a thermal runaway condition depending on the conditions existing when the thermal runaway condition was detected. For example, upon detection of a thermal runaway the protection system may stop charging for a predetermined amount of time to allow the temperature of the components to cool off. The protection system may also force the battery charger into a maintenance state. Various exemplary responses are indicated in Table 1 below. The various stages are identified in FIG. 1B.

TABLE 1

| Stage | Amps | Volts | Trigger | Response | Comment |
|---|---|---|---|---|---|
| Bulk | Not Applicable | <12.2 volts | Time > Limit 1 | Abort charging | Limit 1 typically a few to several hours depending on charge rate |
| Bulk | Not Applicable | <14.2 volts | Time > Limit 2 | Abort charging | Limit 2 typically several hours to 1 day depending on charge rate. |
| Constant Current | DutyLmt | <MaintVolt | DutyTrend > DtLimit | ReduceMaintVolt Continue di/dt | MaintVolt too high |

TABLE 1-continued

| Stage | Amps | Volts | Trigger | Response | Comment |
|---|---|---|---|---|---|
| Constant Current | >DutyLmt | ≧MaintVolt | DutyTrend > DtLimit | Cycle current on and off | Allow battery to cool during off time |
| Constant Current | <DutyLmt | ~MaintVolt | Time = Limit 3 | Go to Maintenance State | Limit 3—typically at least one day |
| End of Charge | Not Applicable | Not Applicable | DutyTrend > DtLimit | Go to Maintenance State | Charging nearly complete. |

Obviously, many modifications and variations of the present invention are possible in light of the above teachings. Thus, it is to be understood that, within the scope of the appended claims, the invention may be practiced otherwise than as specifically described above.

We claim:

1. A method for detecting a thermal runaway condition in a battery under charge in which said battery is charged in both a constant current mode of operation in which said battery is charged with a constant charging current and a constant voltage mode of operation in which said battery is charged with a constant charging voltage in which said battery is charged according to a known charging characteristic during a normal condition defining normal charging voltage and normal charging current curves, the method comprising the steps of:
   (a) monitoring the charging voltage and the charging current supplied by a battery charger to a battery under charge during a constant current mode of operation and a constant voltage mode of operation;
   (b) providing an indication of an anomaly when at least one of said charging voltage and the charging current deviate from said normal charging voltage and normal charging current curves; and
   (c) providing an indication of a thermal runaway condition in response to the indication of the anomaly.

2. The method as recited in claim 1, wherein said step (b) comprises:
   (b) providing an indication of an anomaly as a function of the charging current and the battery voltage during said constant current mode of operation.

3. The method as recited in claim 1, wherein said step (b) comprises:
   (b) providing an indication of an anomaly as a function of the amount of time required for the battery to reach a predetermined voltage during said constant current mode of operation.

4. The method as recited in claim 1, wherein said step (b) comprises:
   (b) providing an indication of an anomaly as a function of the amount of charging current required for the battery to reach a predetermined voltage during said constant current mode of operation.

5. The method as recited in claim 1, wherein said battery is charged with a charging current having a variable duty cycle and step (b) comprises:
   (b) providing an indication of an anomaly in said constant voltage mode of operation as a function of the duty cycle of said charging current.

6. The method as recited in claim 1, wherein said step (b) comprises:
   (b) providing an indication of an anomaly as a function of the battery voltage during said constant current mode of operation.

7. A battery charger comprising:
   a charging circuit for charging a battery with a constant charging current in a constant current mode and a constant voltage in a constant voltage mode of operation in which said battery is charged according to a known charging characteristic during a normal condition defining normal charging voltage and normal charging current curves; and
   one or more monitoring devices for monitoring at least one of the charging voltage and the charging current supplied by a battery charger to a battery under charge during a constant current mode of operation and a constant voltage mode of operation; wherein said charging circuit is configured to provide an indication of an anomaly when at least one of said charging voltage and the charging current deviate from said normal charging voltage and normal charging current curves;
   providing an indication of a thermal runaway condition in response to the indication of the anomaly.

8. The battery charger as recited in claim 7, wherein said charging circuit is configured to provide an indication of an anomaly as a function of the charging current and the battery voltage during said constant current mode of operation.

9. The battery charger as recited in claim 7, wherein said charging circuit is configured to provide an indication of an anomaly as a function of the amount of time required for the battery to reach a predetermined voltage during said constant current mode of operation.

10. The battery charger as recited in claim 7, wherein said charging circuit is configured to provide an indication of an anomaly as a function of the amount of charging current required for the battery to reach a predetermined voltage during said constant current mode of operation.

11. The battery charger as recited in claim 7, wherein said charging circuit is further configured to provide an indication of an anomaly in a constant voltage mode of operation as a function of said one or more parameters.

12. The battery charger as recited in claim 7, wherein said charging circuit is configured to vary the duty cycle of said charging current and further configured to track the duty cycle of said charging current in said constant voltage mode of operation and provide an indication of an anomaly in said constant voltage mode of operation as a function of the duty cycle of said charging current.

13. A battery charger comprising:
a charging circuit for charging a battery in a constant current mode in which said battery is charged with a constant charging current and a constant voltage mode of operation in which said battery is charged with a constant charging voltage, said charging circuit configured to vary the duty cycle of said charging circuit and further configured to provide an indication of a thermal runaway condition when the trend of said duty cycle indicates an anomaly; and
one or more monitoring devices for monitoring at least one of the charging voltage and the charging current supplied by a battery charger to a battery under charge during a constant current mode of operation and a constant voltage mode of operation.

14. A battery charger comprising:
a charging circuit for charging a battery in a constant current mode in which said battery is charged with a charging current and a constant charging voltage in which said battery is charged according to a known charging characteristic during a normal condition defining a normal charging voltage and normal charging current curves, wherein said charging circuit is configured to detect anomalies in said charging characteristic when at least one of said charging voltage and the charging current deviate from said normal charging voltage and normal charging current curves when said battery charger is in said constant current mode of operation; and one or more monitoring devices for monitoring at least one of the charging voltage and the charging current supplied by a battery charger to a battery under charge and providing an indication of a thermal runaway condition in response to said anomalies.

* * * * *